(12) United States Patent  (10) Patent No.: US 6,332,491 B1
Rossini  (45) Date of Patent: Dec. 25, 2001

(54) ACTUATION ASSEMBLY FOR VENETIAN BLINDS OR THE LIKE INSIDE DOUBLE-GLAZING UNITS

(75) Inventor: Mauro Rossini, Este (IT)

(73) Assignee: Finvetro S.r.l., Este (IT)

( * ) Notice: Subject to any disclaimer, the term of this patent is extended or adjusted under 35 U.S.C. 154(b) by 0 days.

(21) Appl. No.: 09/685,672

(22) Filed: Oct. 11, 2000

(30) Foreign Application Priority Data

Oct. 13, 1999 (IT) .............................................. PD99A0225

(51) Int. Cl.⁷ .................................................. E06B 9/264
(52) U.S. Cl. .................................. 160/107; 160/168.1 P; 160/176.1 P
(58) Field of Search ...................... 160/168.1 P, 176.1 P, 160/107, 310, 311, DIG. 17

(56) References Cited

U.S. PATENT DOCUMENTS

| | | | |
|---|---|---|---|
| 4,979,552 | * 12/1990 | Zanden | 160/107 |
| 5,396,944 | * 3/1995 | Rossini | 160/107 |
| 5,699,845 | * 12/1997 | Jelic | 160/107 |
| 5,769,142 | * 6/1998 | Nicolosi | 160/107 |
| 6,059,006 | * 5/2000 | Rossini | 160/107 |
| 6,065,524 | * 5/2000 | Rossini | 160/107 |
| 6,095,223 | * 8/2000 | Rossini et al. | 160/107 |

FOREIGN PATENT DOCUMENTS

| | | |
|---|---|---|
| 42 32 395 | 3/1994 | (DE) . |
| 0 845 572 | 6/1998 | (EP) . |
| 0 863 289 | 9/1998 | (EP) . |

* cited by examiner

Primary Examiner—David M. Purol
(74) Attorney, Agent, or Firm—Guido Modiano; Albert Josif; Daniel O'Byrne

(57) ABSTRACT

An actuation assembly in a double-glazing unit with a perimetric frame which supports two glass panes which form, between them, a sealed air space which accommodates a light blocking blind which is adapted to be orientated and/or moved from a fully packed or rolled-up condition to unfolded conditions and vice versa. The actuation assembly has a rotor which is arranged between the panes, is connected so as to rotate together with an actuation shaft of the light blocking blind, and is provided with one or more permanent magnets which are arranged with alternating polarities, and at least two electromagnets which are arranged so that when they are crossed by an electric current they generate respective magnetic fields whose polarities can vary according to the direction of the current and are arranged on corresponding angular positions with respect to the rotor.

16 Claims, 3 Drawing Sheets

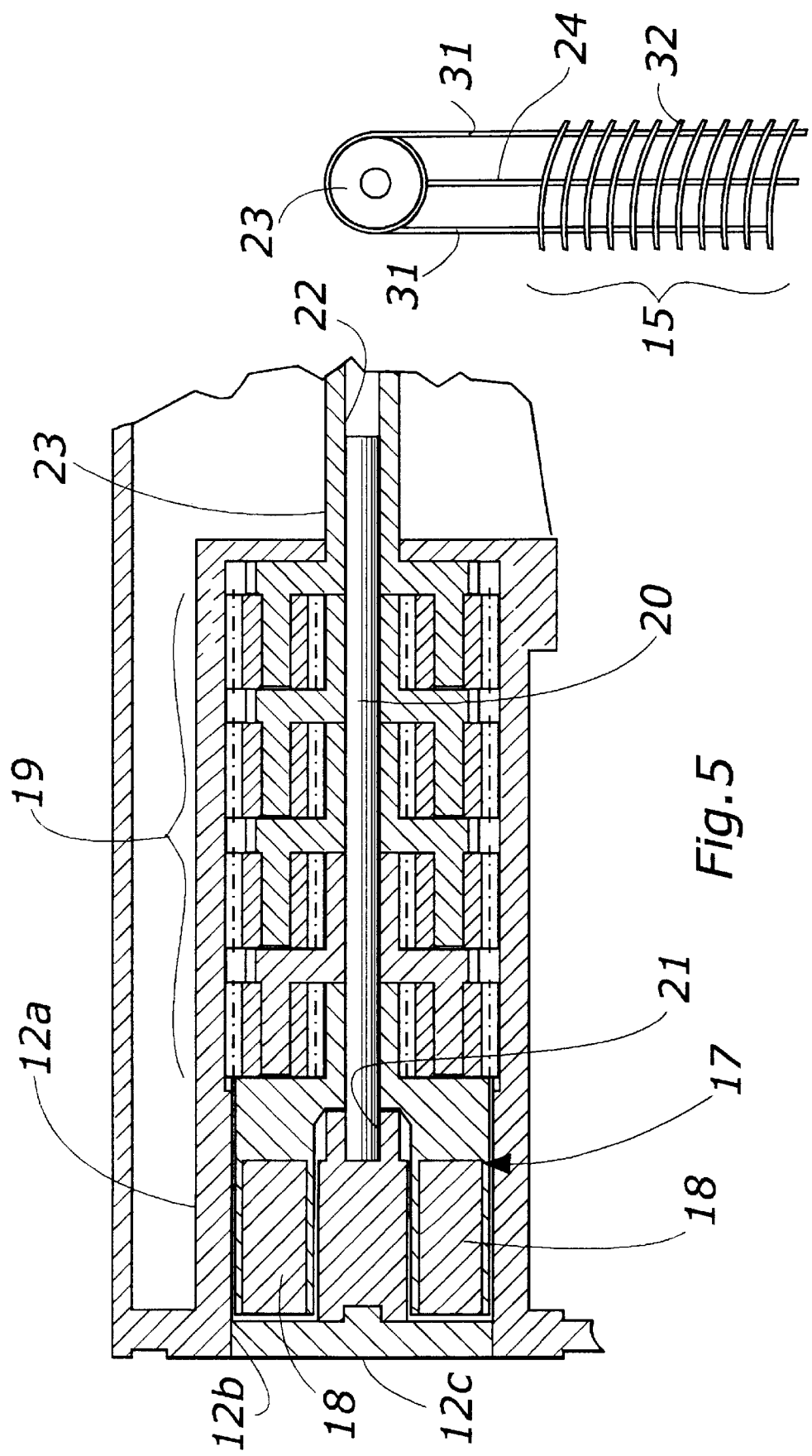

ACTUATION ASSEMBLY FOR VENETIAN BLINDS OR THE LIKE INSIDE DOUBLE-GLAZING UNITS

BACKGROUND OF THE INVENTION

The present invention relates to an actuation assembly particularly for double-glazing units.

It is known that double-glazing units are currently particularly appreciated due to their functional characteristics of thermal insulation and soundproofing.

In particular, double-glazing units are door and window units of the type comprising a perimetric frame which supports two parallel panes which are at least partly transparent to light and form, between them, a sealed air space which accommodates light blocking means (Venetian blinds, pleated curtains or the like) moved by motor means from a fully packed or rolled-up condition to an unfolded condition which provides said blocking and vice versa.

One of the main problems of these double-glazing units is transmitting the motion of the motor means to the kinematic systems for moving the blocking means without compromising the hermetic seal of the frame of the double-glazing unit.

For this purpose, magnetic couplings have been conceived which are arranged partly inside the double-glazing unit and partly outside it and are substantially constituted by two facing shaft segments which support mushroom-shaped expansions constituted by circular permanent magnets.

In particular, the internal and external magnets face each other during use, so as to close axial lines of a magnetic field.

Automatically-actuated external magnets are associated with electric gearmotors and are accommodated with them in box-like structures which are applied to the double-glazing units in various manners.

Although the magnetic couplings solve the problem of hermetic sealing, they are not free from drawbacks.

First of all, it is known that the force transmitted by the magnetic couplings varies according to the facing surface, which is proportional to the closed field lines; accordingly, in this regard it is evident that in order to increase the force that can be transmitted by the coupling it is necessary to provide magnets having larger radial dimensions.

However, the seats for accommodating the magnets cannot easily withstand radial size increases, since they lie predominantly longitudinally.

An assembly has recently been devised which comprises a magnetic device for kinematic connection between an electric motor and the kinematic systems for moving the blocking means.

The assembly is composed of a ring of first permanent magnets, which is connected so as to rotate together with the actuation axis of the blocking means, and a ring of second permanent magnets having a pole orientation which is parallel and identical to that of the first ring; said second ring is adapted to turn in relation to the rotation of the first ring due to the closure of radial field lines.

The two rings can be coaxial, one inside the other, or parallel to each other.

In the first case, the motor is arranged between the panes but is encapsulated in a box-like structure which makes it removable and separate from the atmosphere inside the double-glazing unit.

Although this first case is a considerable improvement in terms of reducing space occupation, it does not allow controlled stepwise rotation of the motor and therefore it is difficult to provide fine adjustment of the orientation of the laminas if the blocking means is a Venetian blind.

This shortcoming is in any case also present in the magnetic couplings associated with motor drives described earlier.

In the second case, one of the two rings of magnets is internal and the other one is external, i.e., one of the panes is interposed between them, and the motor is coupled to the external one.

Also in this case, stepwise adjustment of rotation is not possible.

SUMMARY OF THE INVENTION

The aim of the present invention is to provide an actuation assembly for Venetian blinds or the like in double-glazing units which is balanced from a mechanical standpoint and allows stepwise rotation of the shaft that supports the blind.

Within the scope of this aim, an object of the present invention is to provide an actuation assembly which is compact.

Another object of the present invention is to provide an actuation assembly which has a smaller number of components than conventional assemblies.

Another object of the present invention is to provide an actuation assembly which is particularly adaptable to various double-glazing units.

Another object of the present invention is to provide an actuation assembly which is reliable and ensures a long operating life.

Another object of the present invention is to provide an actuation assembly which can be manufactured with known technologies.

This aim and these and other objects which will become better apparent hereinafter are achieved by an actuation assembly, particularly for double-glazing units with a perimetric frame which supports two glass panes which form, between them, a sealed air space which accommodates light blocking means adapted to be orientated and/or moved from a fully packed or rolled-up condition to unfolded conditions and vice versa, comprising a rotor which is arranged between said panes, is connected so as to rotate together with an actuation shaft of said light blocking means, and is provided with a plurality of permanent magnets which are arranged with alternating polarities, and at least two electromagnets which are arranged so that when they are crossed by electric current they generate respective magnetic fields whose polarities can vary according to the direction of the current and are arranged on corresponding angular positions with respect to said rotor.

BRIEF DESCRIPTION OF THE DRAWINGS

Further characteristics and advantages of the present invention will become better apparent from the following detailed description of two embodiments thereof and of corresponding variations, illustrated only by way of non-limitative example in the accompanying drawings, wherein:

FIG. 5 is a sectional view, taken along a longitudinal plane, of the assembly of FIG. 1, comprising a motion reduction unit;

FIG. 6 is a view of part of the side of the Venetian blind inserted in the double-glazing unit of FIG. 1 with the orientation cords.

DESCRIPTION OF THE PREFERRED EMBODIMENTS

Figure 1:
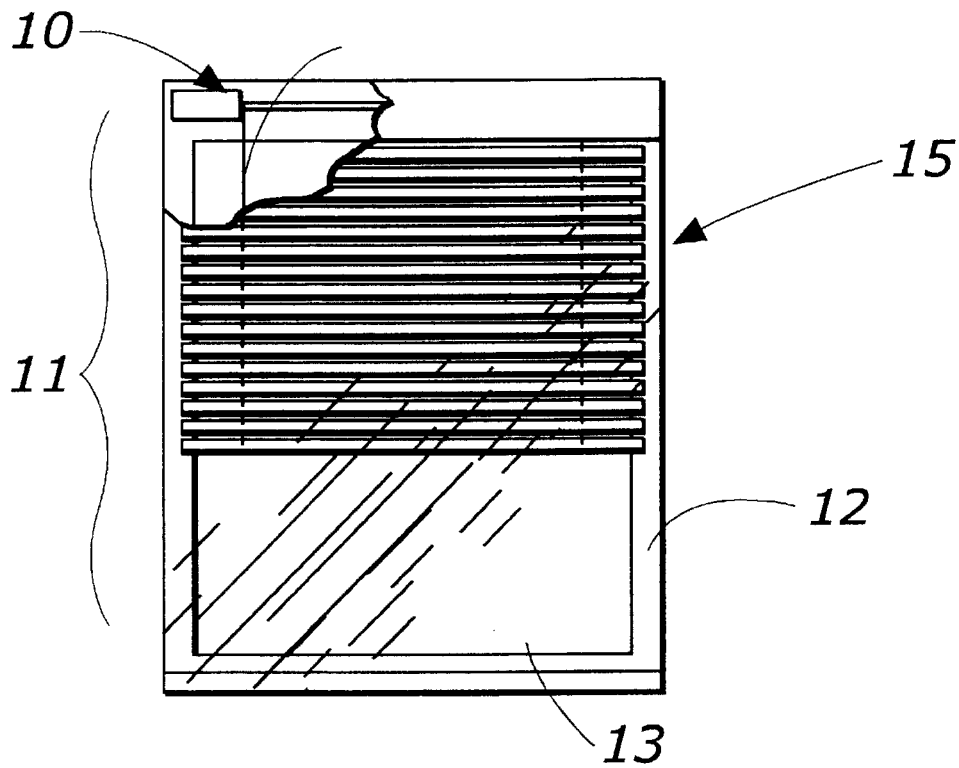
FIG. 1 is a schematic front view of a double-glazing unit provided with an assembly according to the present invention.
Figure 2:
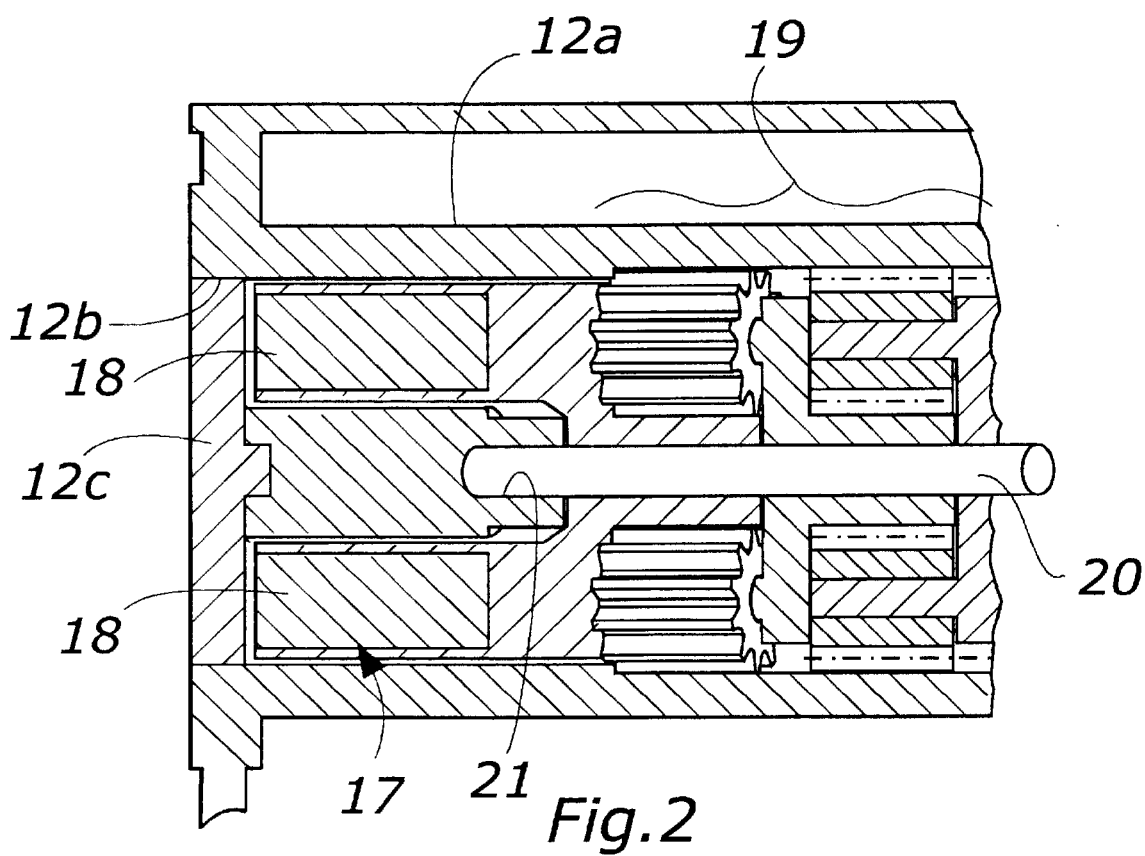
FIG. 2 is an enlarged-scale sectional view, taken along a longitudinal plane, of a detail of the assembly of FIG. 1.
Figure 3:
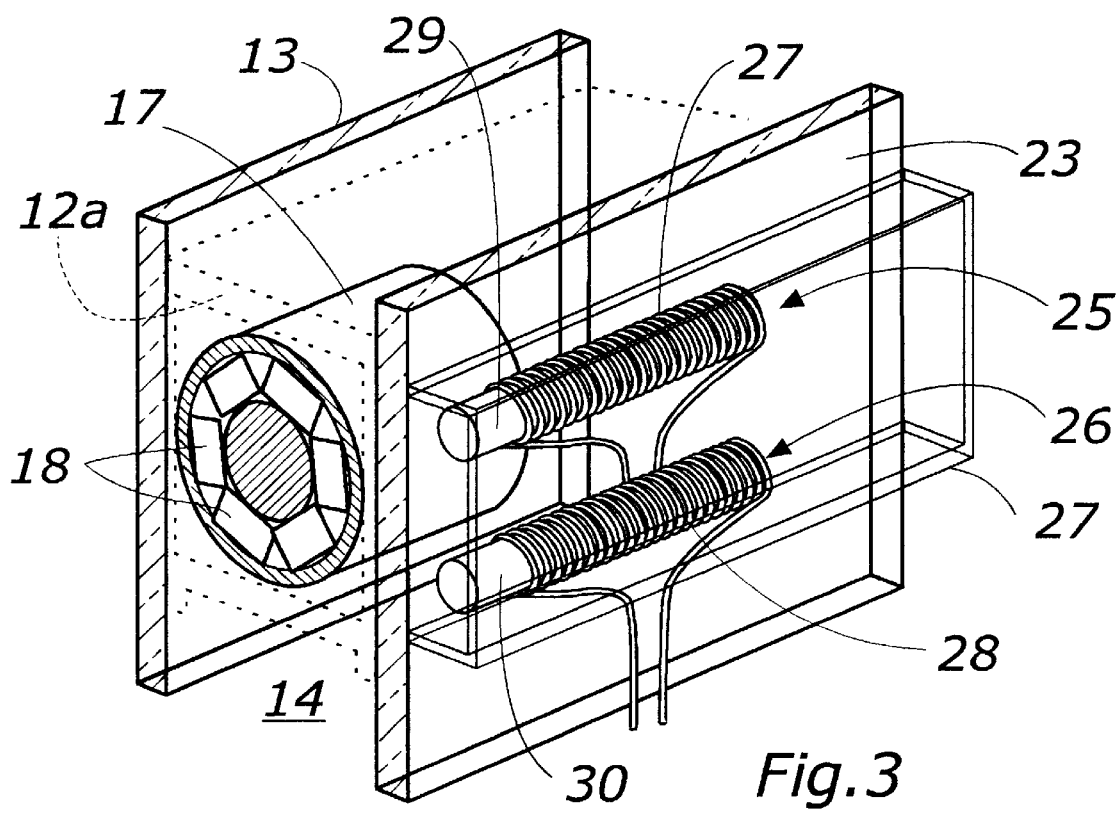
FIG. 3 is a perspective view, with parts shown in phantom lines, of the assembly of FIG. 1.
Figure 4:
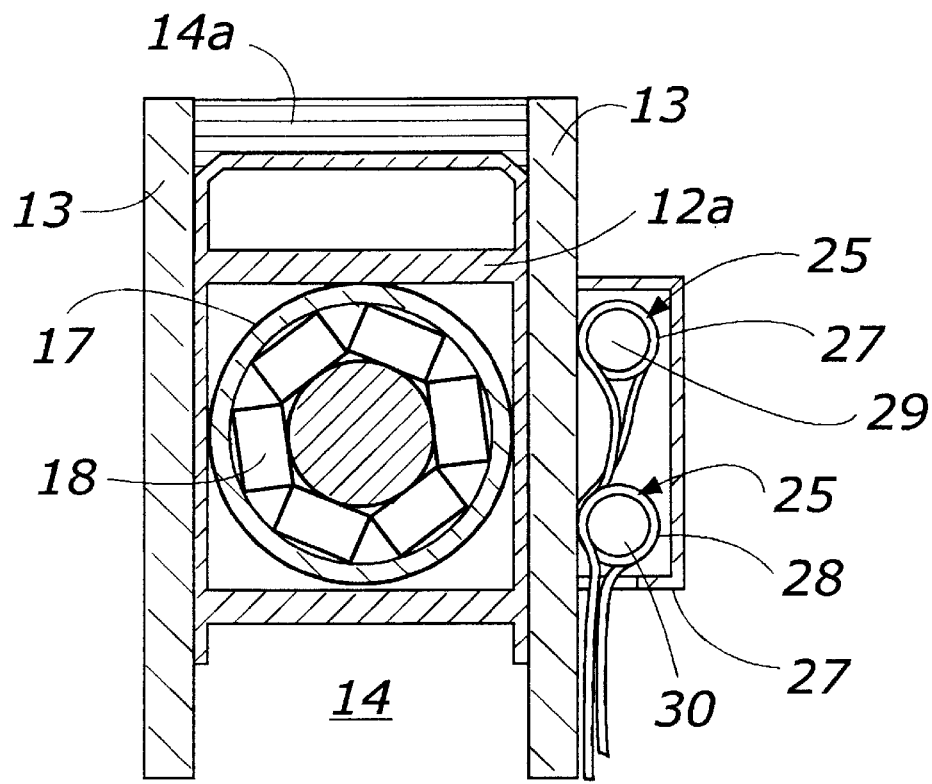
FIG. 4 is a sectional view, taken along a transverse plane, of the assembly of FIG. 1.

With particular reference to FIGS. 1 to 6, a double-glazing unit provided with an actuation assembly 10 according to the invention is generally designated by the reference numeral 11.

The double-glazing unit 11 comprises a perimetric frame 12 which supports, in this case, two parallel glass panes 13 which form, between them, an air space 14 which is sealed by means of a perimetric seal 14a provided by means of silicone and which accommodates light blocking means which in this case are constituted by a Venetian blind, generally designated by the reference numeral 15.

The blind 15 is moved from a fully packed condition to an unfolded condition and vice versa.

Part of the assembly 10 is accommodated in a shaped hollow element 12a which replaces a corner region of the frame 12 and comprises, in this embodiment, a rotor 17 with a plurality of magnets 18 arranged with alternating radial polarities.

As an alternative, the polarities can also be arranged axially.

The shaped hollow element 12a, which in practice lies between the two glass panes 13, can conveniently separate the components that it contains from the atmosphere inside the double-glazing unit 11, and conveniently its interior may be accessed through an opening 12b provided at the edge of the double-glazing unit 11 and closed by a removable cover 12c.

The rotor 17 is axially connected to a multiple-stage epicyclic reduction unit 19 and is supported, together with said unit, by a shaft 20 whose ends are freely supported in corresponding seats 21 and 22, of which one belongs to the structure of the hollow element 12a and one belongs to a hollow shaft 23.

The last stage of the reduction unit 19 is rigidly coupled to the hollow shaft 23 which winds the cords 24, from which the lower end of the Venetian blind 15 is suspended, and the cords 31 for orientating the slats 32.

According to the invention, the unit 10 also comprises two electromagnets, designated by the reference numerals 25 and 26 respectively, which in this case lie outside the double-glazing unit 11 and are accommodated in a box-like structure 27 on the outer face of one of the panes.

The two electromagnets 25 and 26 are each composed of a winding 27 and 28 and of a ferromagnetic core 29 and 30, and are arranged so that when they are crossed by an electric current they generate respective magnetic fields with polarities which can vary according to the direction of the current and are arranged in corresponding angular positions radially with respect to said rotor 17 (or, as an alternative, axially).

In practice, by generating at the ends of the cores 29 and 30 of the electromagnets 25 and 26 an alternation of positive and negative polarities which attract or repel the corresponding mutually close polarities of the rotor 17, a rotation of said rotor is produced.

The speed depends on the frequency of the alternations and the angle of each partial rotation depends on the angle between two consecutive magnets 18 of the rotor 17 with respect to the rotation axis and on the angle formed between the two electromagnets 25 and 26 with respect to said axis.

Each alternation of current corresponds to a single partial rotation, and therefore a stepwise rotation of the rotor 17 is obtained which can be controlled at will and it is possible to adjust the number of turns chosen for the lowering or lifting of the blind 15 and to adjust the inclination of the slats with a precision which depends on the angle of each individual partial rotation and on the reduction ratio of the reduction unit 19.

In practice it has been observed that the present invention has achieved the intended aim and objects.

In particular, it should be noted that stepwise rotation of the shaft that supports the blind with a compact actuation assembly has been made possible.

Moreover, the actuation assembly has a smaller number of components than conventional assemblies, since in practice it does not have the electric actuation motor (which is replaced by the pair of electromagnets).

The reduced number of components is further beneficial to reliability and durability in operation.

The present invention is susceptible of numerous modifications and variations, all of which are within the scope of the same inventive concept.

Thus, for example, the two electromagnets can also be arranged inside the space between the panes and can also be accommodated in a box-like structure which is fixed at its end to the rim of said double-glazing unit (in an upward region or laterally).

The details can be replaced with other technically equivalent elements, and the materials and the dimensions may be any according to requirements.

The disclosures in Italian Patent Application No. PD99A000225 from which this application claims priority are incorporated herein by reference.

What is claimed is:

1. An actuation assembly in a double-glazing unit, the double-glazing unit comprising:

a perimetric frame;

two glass panes which are supported by said perimetric frame;

a sealed air space which is formed between said two glass panes supported by said permetric frame;

a light blocking means which has a rotating actuation shaft and which arranged inside said air space and which is adapted to be orientated in a light blocking configuration and in a light transmitting configuration;

the actuation assembly comprising:

a rotor which is arranged between said panes, said rotor being connected to said actuation shaft of said light blocking means so as to rotate together with said actuation shaft of said light blocking means;

one or more permanent magnets of said rotor and which are arranged with mutually alternating polarities; and at least two electromagnets arranged adjacent said one or more permanent magnets of said rotor and each of said electromagnets comprising a ferromagnetic core and an electric winding about said ferromagnetic core whereby an alternating electric current supplied to said electric winding provides a stepwise rotation of said rotor.

2. The assembly according to claim 1, wherein said one or more permanent magnets are arranged with radial polarities.

3. The assembly according to claim 1, wherein said one or more permanent magnets are arranged with axial polarities.

4. The assembly according to claim 1, wherein said at least two electromagnets are arranged with radial polarities.

5. The assembly according to claim 1, wherein said at least two electromagnets are arranged with axial polarities.

6. The assembly according to claim 1, wherein said two electromagnets are external to said double-glazing unit.

7. The assembly according to claim 1, wherein said two electromagnets are arranged inside the space between the panes of said double-glazing unit.

8. The assembly according to claim 1, wherein said rotor is axially connected to a reduction unit.

9. The assembly according to claim 8, wherein said reduction unit is a multiple-stage epicyclic reduction unit.

10. The assembly according to claim 8, wherein said rotor and said reduction unit are contained in a shaped hollow element of a corner portion of said perimetric frame.

11. The assembly according to claim 10, wherein said hollow element comprises a first seat and said actuation shaft comprises a second seat, and wherein said rotor and said reduction unit are supported by a shaft having a first end supported in said first seat of said hollow element and a second end supported in said second seat of said actuation shaft.

12. The assembly according to claim 8, wherein said light blocking means comprises a Venetian blind having cords which are wound by said actuation shaft, a lower end of said Venetian blind being suspended from said cords, said reduction unit being kinematically connected to said actuation shaft.

13. The assembly according to claim 8, wherein said light blocking means comprises a Venetian blind having orientation cords which are wound by said actuation shaft, said Venetian blind having slats fixed to said orientation cords, said reduction unit being kinematically connected to said actuation shaft.

14. The assembly according to claim 1, wherein said two electromagnets are accommodated in a box-like structure which is fixed to an outer face of one of the panes.

15. The assembly according to claim 1, wherein said two electromagnets are accommodated in a box-like structure which is fixed at one end to a rim of said double-glazing unit.

16. The assembly according to claim 10, wherein said shaped hollow element separates said rotor and said reduction unit of said assembly contained in said shaped hollow element from inside the space formed between the two glass panes of the double-glazing unit and wherein an opening is located at a rim of said double-glazing unit for access inside said shaped hollow element.

* * * * *